March 13, 1934.  E. A. J. ERICSSON  1,951,278

FRACTURE NAIL

Filed June 29, 1932

Inventor
Ernst A. J. Ericsson,
By Marion & Marion
Attorneys.

UNITED STATES PATENT OFFICE 1,951,278

FRACTURE NAIL

Ernst Axel Johan Ericsson, Gottenborg, Sweden

Application June 29, 1932, Serial No. 619,988
In Sweden February 13, 1932

4 Claims. (Cl. 128—92)

This invention relates to fracture nails, and more particularly to such nails as are used in the healing of fractures of the neck of the thigh-bone.

In the setting of fractures of the neck of the thigh-bone it has been proposed to drill a hole through the broken parts of the bone by means of a boring apparatus after said parts have been placed in proper position. After the removal of the borer, a nail of special design is driven through the thigh-bone and the neck and head thereof. The object of this nail is to hold the parts of the bone in correct position until they have been united by the healing. The nail then may be pulled out. Such a nail comprises a stem with a head, said stem consisting of a number of longitudinal ridges (usually three) arranged in angular relation to each other and projecting radially so that the cross-section of the nail has the shape of a three-pointed star if three ridges are provided. When this nail is forced into the drilled hole the ridges cut into the wall of the hole whereby the broken parts of the bone are secured in their mutual position. It has, however, occurred that the nail, when it has been driven into the bone for a part of its length, does not follow the direction of the drilled hole but makes its way laterally through the bone. Such failure in the insertion of the nail can have serious consequences by the splintering of the superficial portion of the bone penetrated by the nail. By such failure the parts of the bone will also be displaced or turned from their correct mutual position. When a wrong position of the nail has been discovered it has to be pulled out and a second nail, eventually after preceding fresh drilling, be inserted. Consequently, an object desired by surgeons has been a fracture nail of such a character as to obviate a failure of the kind mentioned. The present invention solves this problem in an efficient and very simple way.

An embodiment of the invention is shown in the accompanying drawing, in which.

The nail comprises the head 1 and the stem constituted by longitudinal ridges 2 projecting radially from a central, substantially cylindrical portion 3. According to the embodiment shown, the ridges are three in number forming angles of about 120 degrees to each other. The height or width of the ridges may be lessened towards the outer end of the stem and the ridges are preferably, particularly in the proximity of said end, sharpened into edges. The central cylindrical portion 3 as also the head 1 is provided with a central longitudinal hole 4 of slightly larger diameter than that of the borer or drilling wire used the thickness of which may be 1,5 to 2 millimeters.

Figures 1, 2, 3:
Fig. 1 is a side elevation of the nail.
Fig. 2 is a view of the head end thereof.
Fig. 3 is a view of the nail seen from its outer stem end.
Figures 4, 5:
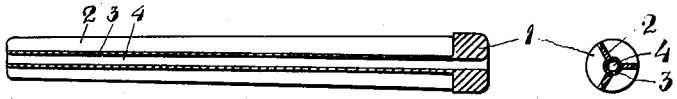
Fig. 4 is a longitudinal section of the same nail.
Fig. 5 is a cross-section of the nail on the line V—V of Fig. 1.
Figure 6:
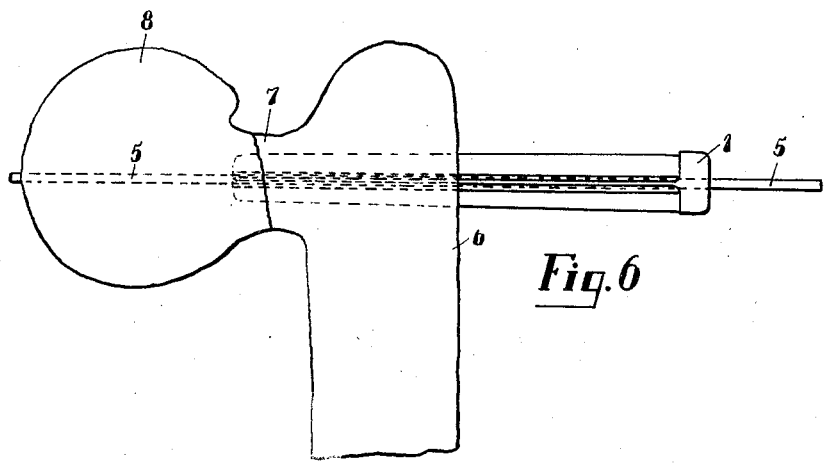
Fig. 6 is a view illustrating the insertion of a nail through the broken neck of a thigh-bone.

In the use of the nail (see Fig. 6) the borer 5 is first drilled through the thigh-bone 6, the fractured neck 7 and the head 8 thereof, whereupon the nail is inserted over the borer while this remains in the drilled hole. The nail is then driven into the bone as far as is required in order to secure the two portions of the fractured neck of the thigh-bone in their natural mutual position. In this operation, the nail will be guided by the borer 5 passing through the hole 4 of the nail so that the latter is caused to follow the direction of the borer. If this direction by a preceding control has been found to be correct, a guaranty will be obtained that also the position of the nail in the bone will be correct. Naturally, the borer will be pulled out after the nail has been inserted. The nail has to remain in the bone until the latter has grown healed, and may remain in the bone after its healing so that the nail will constitute a reinforcement of the bone.

I claim:—

1. A fracture nail comprising a stem and a head, the stem consisting of a central portion and longitudinal ridges projecting from the central portion, and a longitudinal hole through the head portion and stem adapted to receive a borer inserted into the fractured bone whereby the hole in co-operation with the borer will guide the nail when driven into the bone.

2. A fracture nail comprising a stem and a head, the stem consisting of a central portion and and longitudinal ridges projecting therefrom, and a central longitudinal hole extending through said head and central portion of the nail.

3. A fracture nail comprising a stem provided with a central portion and longitudinal ridges projecting substantially radially from the central portion, said central portion having a hole extending longitudinally therethrough adapted to receive a borer inserted into the fractured bone whereby the hole in cooperation with the borer will guide the nail when driven into the bone.

4. A fracture nail comprising a stem having longitudinal ridges projecting substantially radially therefrom, and a head on said stem having an aperture disposed in longitudinal relation with the nail stem and adapted to receive therethrough a borer inserted into the fractured bone whereby to guide the nail when driven into the bone.

ERNST AXEL JOHAN ERICSSON.